United States Patent [19]
Ackermann

[11] Patent Number: 5,870,010
[45] Date of Patent: Feb. 9, 1999

[54] ACTUATOR WITH MINIMIZED AUXILIARY MAGNET, AND THROTTLE DEVICE PROVIDED WITH SUCH AN ACTUATOR

[75] Inventor: Bernd Ackermann, Aachen, Germany

[73] Assignee: U.S. Philips Corporation, New York, N.Y.

[21] Appl. No.: 880,376

[22] Filed: Jun. 23, 1997

[30] Foreign Application Priority Data

Nov. 15, 1996 [EP] European Pat. Off. ............ 962031894

[51] Int. Cl.⁶ ....................................................... H01F 7/00
[52] U.S. Cl. ............................................ 335/229; 335/220
[58] Field of Search .................................... 335/220, 222, 335/223, 224, 225, 227, 228, 229, 272, 230; 123/231, 339

[56] References Cited

U.S. PATENT DOCUMENTS

| | | | |
|---|---|---|---|
| 3,644,763 | 2/1972 | Skorbisch | 335/230 |
| 4,354,465 | 10/1982 | Takeuchi et al. | 123/339 |
| 4,804,934 | 2/1989 | Finke et al. | 335/229 |
| 4,945,330 | 7/1990 | Arita | 335/272 |

FOREIGN PATENT DOCUMENTS

WO9534903 12/1995 WIPO ............................ H01F 7/121

*Primary Examiner*—Lincoln Donovan
*Attorney, Agent, or Firm*—Leroy Eason

[57] ABSTRACT

An electrical actuator for a throttle device has a stator and a rotor, the rotor being coupled to the throttle device and comprising a permanent main magnet. The stator includes in axially extending slots therein auxiliary permanent magnets which interact with the rotor magnet to exert a magnetostatic torque ($T_{MS}$) on the rotor which tends to rotate it to a pre-set rest position. The stator also has an energizing coil which when actuated results in an electromagnetic torque ($T_{EM}$) on the rotor which is opposed to the magnetostatic torque and causes the rotor to pivot through a limited angle of rotation. The thickness and width of the auxiliary permanent magnets are selected so that the cross-sectional area thereof provides a maximum value of the magnetostatic torque ($T_{MS}$) per unit volume thereof, thus minimizing the necessary volume and weight of the auxiliary permanent magnets.

4 Claims, 3 Drawing Sheets

ACTUATOR WITH MINIMIZED AUXILIARY MAGNET, AND THROTTLE DEVICE PROVIDED WITH SUCH AN ACTUATOR

BACKGROUND OF THE INVENTION

1. Field of the Invention

The invention relates to an electrical actuator comprising a first actuator body and a second actuator body which is pivotable relative to the first actuator body about an axis of rotation, one of the first and second actuator bodies being provided with a permanent main magnet, and the other one of the first and second actuator bodies being provided with electrical energizing means for exerting an electromagnetic torque on the second actuator body and with a permanent auxiliary magnet for exerting a magnetostatic torque on the second actuator body.

The invention also relates to a throttle device for use in an air inlet of an internal-combustion engine, which throttle device comprises a throttle-valve housing, an air passage which is connectable to the air inlet, a throttle valve which is journalled in the throttle-valve housing so as to be pivotable in the air passage, and an electrical actuator for pivoting the throttle valve.

2. Related Art

An electrical actuator and a throttle device of the kinds mentioned in the opening paragraphs are known from WIPO Publication WO 95/34903, published Dec. 21, 1995. The throttle valve of the known throttle device is pivotable in the air passage by means of the known actuator. The second actuator body of the actuator and the throttle valve coupled to the second actuator body are urged into a rest position under the influence of the magnetostatic torque of the actuator when no electrical current is supplied to the energizing means of the actuator. When an electrical current is supplied to the energizing means, the second actuator body and the throttle valve are pivoted under the influence of the electromagnetic torque of the actuator through a limited angle of rotation about the axis of rotation into a position in which the electromagnetic torque, the magnetostatic torque and external torques exerted on the throttle valve are in balance. Said position is determined by the value of the current through the energizing means, so that the position can be controlled by controlling the current through the energizing means. The use of the permanent auxiliary magnet achieves that the second actuator body and the throttle valve are firmly urged into the rest position, so that the rest position is not disturbed by external loads on the throttle valve such as, for example, fluctuations of the pressure difference across the throttle valve.

A disadvantage of the known actuator is that the auxiliary magnet must have a minimum thickness for achieving a required mechanical strength and for preventing demagnetization thereof by the permanent main magnet. Said minimum thickness of the auxiliary magnet leads to a magnetostatic torque of the actuator which is not optimal under all circumstances and for all applications of the actuator. Under certain circumstances and for certain applications of the actuator, the magnetostatic torque obtained with the minimum thickness of the auxiliary magnet is too large, so that a relatively strong current through the energizing means is required for pivoting the second actuator body. This leads to an unnecessarily high power consumption and heating of the actuator.

SUMMARY OF THE INVENTION

It is an object of the invention to provide an electrical actuator and a throttle device of the kinds mentioned in the opening paragraphs in which the disadvantages of the known electrical actuator and throttle device are avoided.

According to the invention, the electrical actuator is characterized in that, seen in a direction parallel to the axis of rotation, the permanent auxiliary magnet has an axial length which is smaller than the axial length of the actuator body which is provided with the permanent auxiliary magnet.

Since the axial length of the permanent auxiliary magnet is smaller than the axial length of the actuator body which is provided with the permanent auxiliary magnet, the magnetostatic torque of the actuator is reduced without reducing the thickness of the permanent auxiliary magnet. Thus, the magnetostatic torque of the actuator can be reduced to a value which is sufficient to prevent disturbances of the rest position of the second actuator body which may occur under the influence of external loads exerted on the second actuator body in the rest position where an auxiliary magnet having the minimum required thickness and an axial length equal to the axial length of the actuator body which provided with the auxiliary magnet would lead to a magnetostatic torque which is too large.

A particular embodiment of an electrical actuator according to the invention is characterized in that, seen in an imaginary plane extending transverse to the axis of rotation, a cross-section of the permanent auxiliary magnet has a surface area providing a maximum value of the magnetostatic torque per unit volume of the permanent auxiliary magnet. The surface area of said cross-section of the auxiliary magnet providing said maximum value of the magnetostatic torque per unit volume of the auxiliary magnet can be determined by means of, for example, a two-dimensional analysis of the cross-section of the actuator. With said surface area providing said maximum value of the magnetostatic torque per unit volume of the auxiliary magnet, the axial length of the auxiliary magnet necessary for obtaining the required value of the magnetostatic torque can be reduced to a minimum value, so that the amount of magnetic material of the auxiliary magnet is minimized.

A further embodiment of an electrical actuator according to the invention is characterized in that the second actuator body comprises a cylindrical permanent-magnet rotor body, while the first actuator body comprises a U-shaped stator body having a first pole shoe and a second pole shoe which surround the permanent-magnet rotor body, the first actuator body also being provided with two permanent auxiliary magnets for exerting magnetostatic torque. The permanent auxiliary magnets are provided in a first slot extending parallel to the axis of rotation in a surface of the first pole shoe facing the permanent-magnet rotor body and in a second slot extending parallel to the axis of rotation in a surface of the second pole shoe facing the permanent-magnet rotor body, respectively. The U-shaped stator body is made from a material having a high magnetic permeability and exerts an additional magnetostatic torque on the second actuator body. The characteristics of said additional magnetostatic torque are strongly improved by the presence of the first and second slots in the pole shoes of the stator body. The dimensions of said slots are determined in such a manner that the required characteristics of said additional magnetostatic torque are achieved. Since the dimensions of the slots accommodating the auxiliary magnets can only be varied to a limited amount extent, the width of the auxiliary magnets is predetermined in addition to the minimal thickness of the auxiliary magnets. Therefore, the properties of the invention are obtained to full advantage in this embodiment.

A still further embodiment of an electrical actuator according to the invention is characterized in that, seen in a direction parallel to the axis of rotation, the first slot and the second slot have an axial length which corresponds to the axial length of the first actuator body. The characteristics of the additional magnetostatic torque of the stator body are optimized in this still further embodiment of the electrical actuator.

BRIEF DESCRIPTION OF THE DRAWINGS

The invention will be explained in more detail below with reference to the drawings, in which FIG. 1 diagrammatically shows a throttle device according to the invention, used in an air intake of an internal-combustion engine, FIG. 3 shows a cross-section taken on the line III—III in FIG. 2a.

DESCRIPTION OF THE PREFERRED EMBODIMENTS

Figure 1:
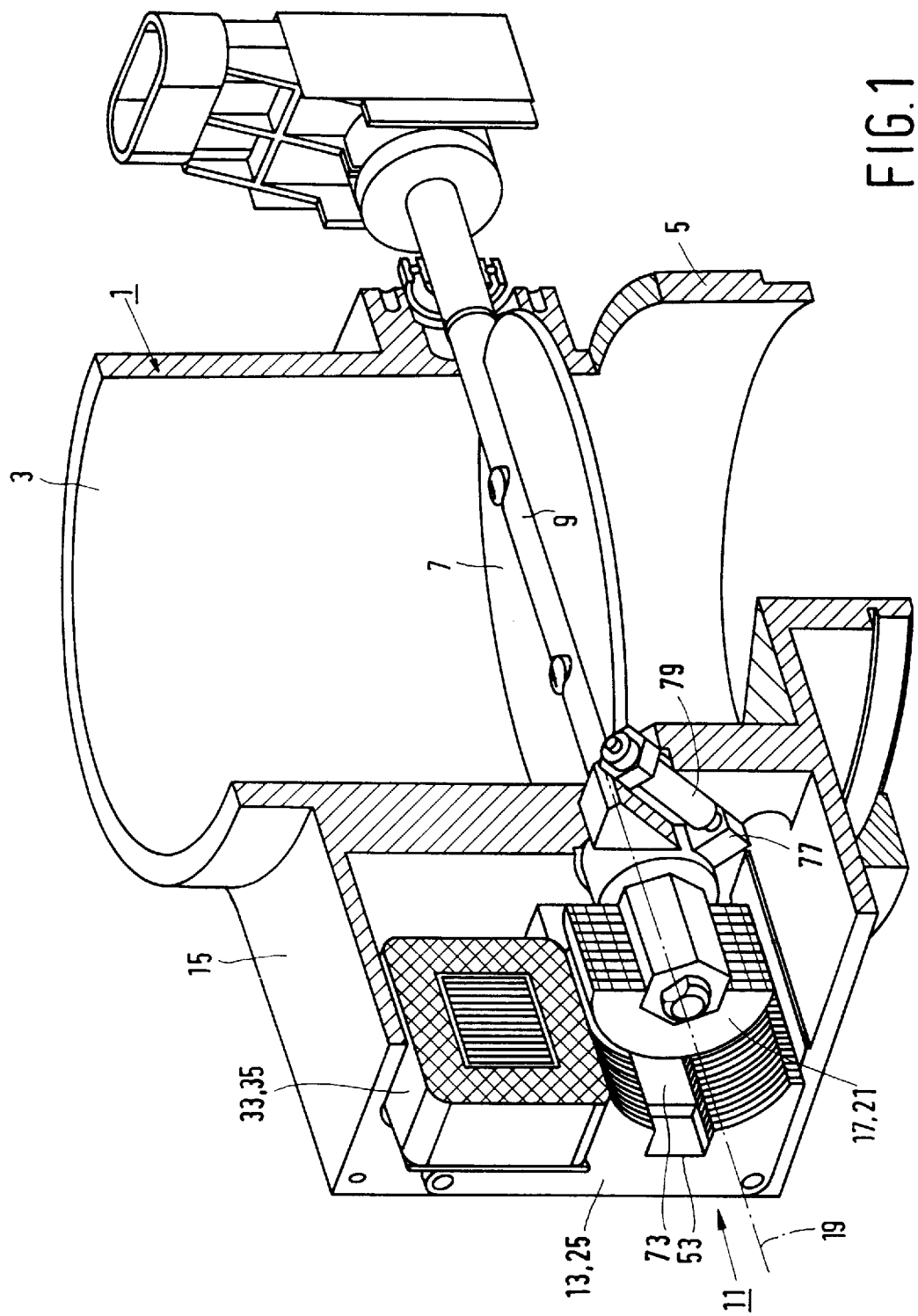

The throttle device shown in FIG. 1 comprises a throttle-valve housing 1 with a tubular air passage 3 and a flange 5 by means of which the throttle device can be connected to an air inlet or manifold of an internal-combustion engine not shown in the drawing. The throttle device further comprises a disc-shaped throttle valve 7 which is mounted on a shaft 9 extending diametrically through the air passage 3. The shaft 9 is pivotably journalled in the flange 5 of the throttle-valve housing 1, so that the throttle valve 7 is pivotable in the air passage 3. When the throttle valve 7 is pivoted, the aperture of the air passage 3 and the air flow to the combustion chambers of the internal-combustion engine are altered.

Figure 2A:
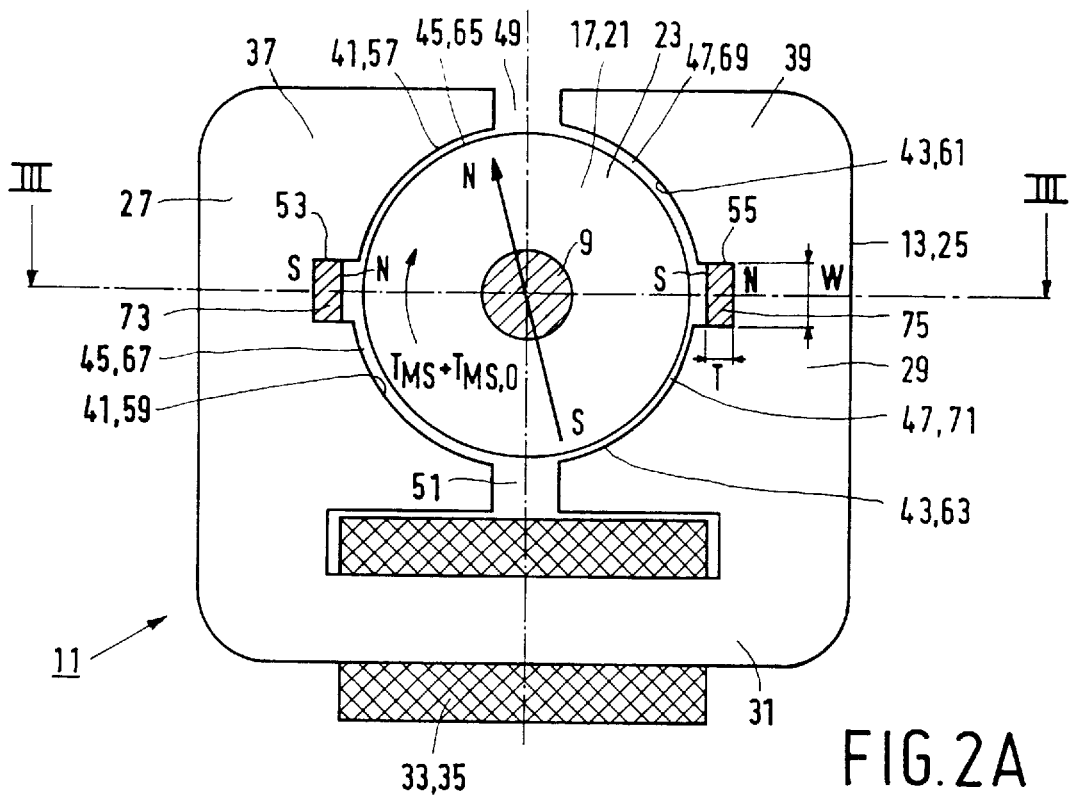
FIG. 2a is a cross-section of an electrical actuator according to the invention, applied in the throttle device of FIG. 1, in a non-energized condition.
Figure 2B:
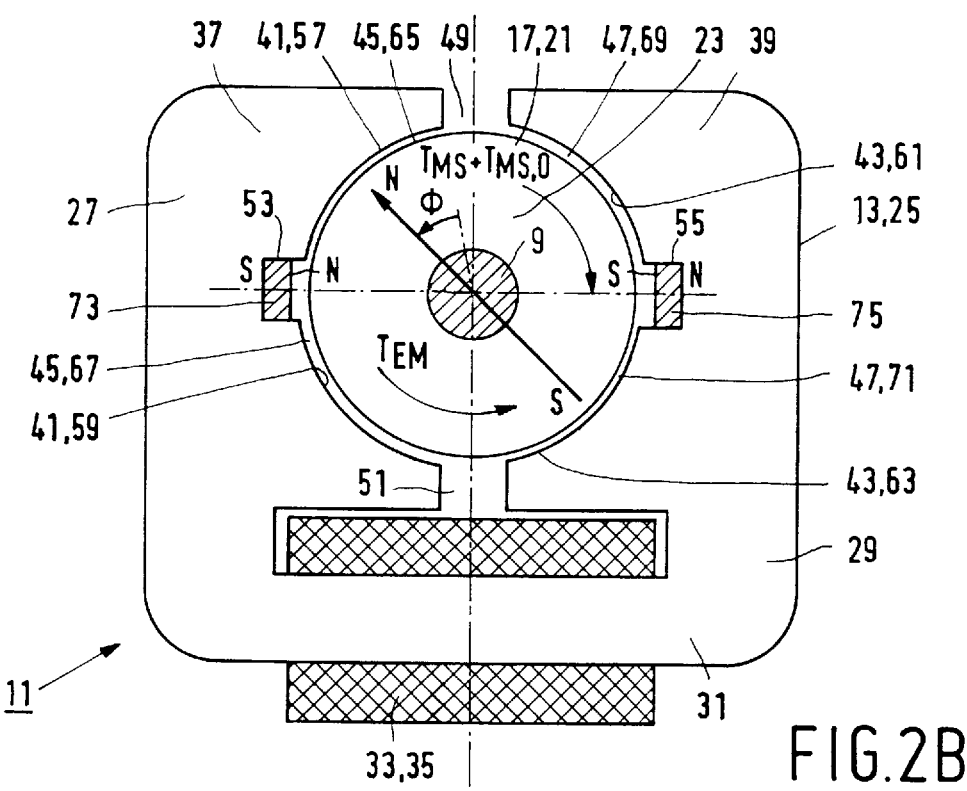
FIG. 2b shows the electrical actuator of FIG. 2a in an energized condition.

The throttle valve 7 is pivotable in the air passage 3 by means of an electrical actuator 11. The actuator 11 comprises a first actuator body 13 which is mounted in an actuator housing 15 of the throttle-valve housing 1 and a second actuator body 17 which is mounted on the shaft 9 so as to be pivotable relative to the first actuator body 13 about an axis of rotation 19. As FIGS. 2a and 2b show, the second actuator body 17 is a cylindrical permanent-magnet rotor body 21 comprising a permanent main magnet 23 which is diametrically magnetized and has a north pole N and a south pole S. The first actuator body 13 comprises a U-shaped stator body 25 made of a material having a high magnetic permeability, such as sintered iron, or of magnetic-steel laminations. The U-shaped stator body 25 comprises two limbs 27, 29 which are interconnected by a base 31. The first actuator body 13 further comprises electrical energizing means 33 having an electrical coil 35 which is supported by the base 31. The limbs 27, 29 of the stator body 25 are each provided with a pole shoe 37, 39, and the pole shoes 37, 39 each have a curved surface 41, 43 facing the permanent-magnet rotor body 21. As FIGS. 2a and 2b show, the curved surfaces 41, 43 of the pole shoes 37, 39 surround the permanent-magnet rotor body 21, the surface 41 defining an air gap 45 between the rotor body 21 and the pole shoe 37, and the surface 43 defining an air gap 47 between the rotor body 21 and the pole shoe 39. Furthermore, a first gap 49 and a second gap 51 are present between the pole shoes 37, 39, while a first slot 53 extending parallel to the axis of rotation 19 is centrally provided in the surface 41 of the pole shoe 37, and a second slot 55 extending parallel to the axis of rotation 19 is centrally provided in the surface 43 of the pole shoe 39. In this way, the surface 41 is divided into a first surface portion 57 and a second surface portion 59, and the surface 43 is divided into a first surface portion 61 and a second surface portion 63, while the air gap 45 is divided into a first air-gap portion 65 and a second air-gap portion 67, and the air gap 47 is divided into a first air-gap portion 69 and a second air-gap portion 71. As FIGS. 2a and 2b show, the width of the diametrically opposed air-gap portions 65, 71 is smaller than the width of the diametrically opposed air-gap portions 67, 69.

As FIGS. 2a and 2b further show, the first actuator body 13 is provided with a first permanent auxiliary magnet 73 and a second permanent auxiliary magnet 75. The first auxiliary magnet 73 is accommodated in the first slot 53 of the first actuator body 13, while the second auxiliary magnet 75 is accommodated in the second slot 55 of the first actuator body 13. As a result of the interaction between the permanent main magnet 23 of the second actuator body 17 and the permanent auxiliary magnets 73, 75 of the first actuator body 13, a magnetostatic torque $T_{MS}$ is exerted on the second actuator body 17 by the auxiliary magnets 73, 75. Furthermore, as a result of the interaction between the permanent main magnet 23 of the second actuator body 17 and the magnetically permeable material of the stator body 25, an additional magnetostatic torque $T_{MS,O}$ is exerted on the second actuator body 17 by the stator body 25. The magnetostatic torques $T_{MS}$ and $T_{MS,O}$ urge the second actuator body 17 and the throttle valve 7 coupled to the second actuator body 17 into a rest position shown in FIG. 2a when the electrical coil 35 of the energizing means 33 is not energized. In said rest position, as FIG. 1 shows, a cam 77 mounted on the second actuator body 17 rests against a mechanical stop 79 of the throttle device. When the electrical coil 35 is energized, an electromagnetic torque $T_{EM}$ is exerted on the second actuator body 17 as a result of the interaction between the permanent main magnet 23 and the electromagnetic field of the coil 35. Said electromagnetic torque $T_{EM}$ pivots the second actuator body 17 and the throttle valve 7 from the rest position shown in FIG. 2a towards a position shown in FIG. 2b which is characterized by an angle of rotation Φ of the second actuator body 17 about the axis of rotation 19 relative to the rest position. In the position shown in FIG. 2b, the electromagnetic torque $T_{EM}$ is in balance with the magnetostatic torques $T_{MS}$ and $T_{MS,O}$ and external torques which are exerted on the throttle valve 7 and are caused by, for example, air-flow forces exerted on the throttle valve 7. When the electrical current through the coil 35 is switched off, the second actuator body 17 and the throttle valve 7 will return to the rest position again under the influence of the magnetostatic torques $T_{MS}$ and $T_{TM,O}$. The value of the angle of rotation Φ in the position shown in FIG. 2b is determined by the value of the electrical current through the coil 35 and is adjustable through adjustment of the current through the coil 35 by an electrical controller not shown in the Figures.

As FIG. 1 shows, the rest position of the second actuator body 17 and the throttle valve 7 corresponds to a so-called limp-home position of the throttle valve 7 in the air passage 3 which differs slightly from a so-called idling position of the throttle valve 7 in which the aperture of the air passage 3 is a minimum. In the limp-home position of the throttle valve 7, which occurs, for example, when the electrical-energy supply of the throttle device fails, the aperture of the air passage 3 allows for a small air flow towards the combustion chambers of the internal-combustion engine, so that an emergency operation of the engine is still possible. The stop 79 is mechanically adjustable, so that the air flow through the air passage 3 in the limp-home position of the throttle valve 7 is adjustable. In all other positions of the throttle valve 7, including the idling and full-throttle positions, in which the aperture of the air passage 3 is a minimum and a maximum, respectively, an electrical current is supplied through the coil 35.

The use of the permanent auxiliary magnets 73, 75 achieves that the throttle valve 7 returns promptly to the rest position when the current through the coil 35 is switched off, and that the throttle valve 7 is firmly held in the rest position. In this manner, the rest position of the throttle valve 7 is not disturbed by external loads on the throttle valve 7 such as, for example, fluctuations of the pressure difference across the throttle valve 7 which occur as a result of the fact that the inlet valves of the combustion chambers of the engine are periodically opened and closed during operation.

Figure 3:
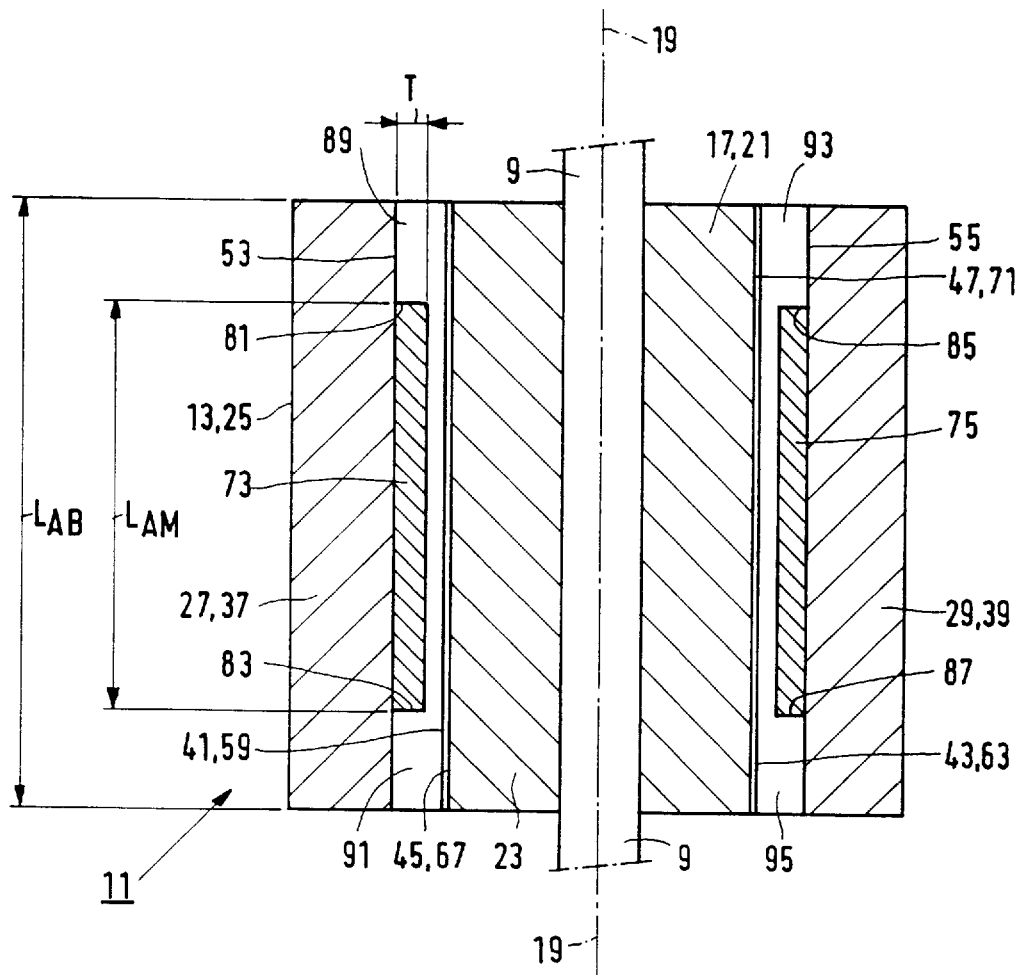

The value of the magnetostatic torque exerted by the auxiliary magnets 73, 75 on the second actuator body 17 depends on the volume of the auxiliary magnets 73, 75. Said volume is determined by the width W and the thickness T of the auxiliary magnets 73, 75, as indicated in FIGS. 2a and 3. The width W of the auxiliary magnets 73, 75 is determined by the width of the slots 53 and 55 in which the auxiliary magnets 73, 75 are accommodated. The presence of the slots 53 and 55 in the first actuator body 13 strongly improves the characteristics of the additional magnetostatic torque $T_{MS,O}$ exerted by the stator body 25 on the second actuator body 17. The characteristics of said additional magnetostatic torque $T_{MS,O}$ are dependent on the width of the slots 53 and 55. Therefore, the width of the slots 53 and 55 and also the width W of the auxiliary magnets 73, 75 are predetermined to lie within certain limits by the required characteristics of the additional magnetostatic torque $T_{MS,O}$. Furthermore, the auxiliary magnets 73, 75 must have a minimum thickness $T_{MIN}$ for achieving a required mechanical strength and for preventing demagnetization of the auxiliary magnets 73, 75 by the permanent main magnet 23. In view of the above-mentioned predetermined width W and minimum thickness $T_{MIN}$ of the auxiliary magnets 73, 75, the cross-sections of the auxiliary magnets 73, 75, seen in an imaginary plane extending transverse to the axis of rotation 19, will have at least a minimum surface area providing a predetermined minimum value of the magnetostatic torque per unit volume of the auxiliary magnets 73, 75. As shown in FIGS. 2a and 3, the auxiliary magnets 73, 75 are provided with a thickness T which is greater than said minimal thickness $T_{MIN}$. The thickness T is determined in such a manner that, with the predetermined width W of the auxiliary magnets 73, 75 and seen in an imaginary plane extending transverse to the axis of rotation 19, the cross-sections of the permanent auxiliary magnets 73, 75 have a surface area providing a maximum value of the magnetostatic torque $T_{MS}$ per unit volume of the auxiliary magnets 73, 75. The surface area of said cross-sections of the auxiliary magnets 73, 75 providing said maximum value of the magnetostatic torque $T_{MS}$ per unit volume of the auxiliary magnets 73, 75 is determined by means of a generally known and usual two-dimensional analysis of the cross-section of the actuator 11.

As shown in FIG. 3, the permanent auxiliary magnets 73, 75, seen in a direction parallel to the axis of rotation 19, have an axial length $L_{AM}$ which is smaller than an axial length $L_{AB}$ of the first actuator body 13 provided with the auxiliary magnets 73, 75.

The axial length $L_{AM}$ of the auxiliary magnets 73, 75 is determined in such a manner that, with the above-mentioned predetermined width W and the thickness T providing said maximum value of the magnetostatic torque $T_{MS}$ per unit volume of the auxiliary magnets 73, 75, a value of the magnetostatic torque $T_{MS}$ is obtained which is sufficient to prevent disturbances of the rest position of the throttle valve 7 which may arise under the influence of external loads exerted on the throttle valve 7. Since with the width W and thickness T the magnetostatic torque $T_{MS}$ per unit volume of the auxiliary magnets 73, 75 is a maximum, the volume and weight of the auxiliary magnets 73, 75 are thus reduced to minimum values.

As shown in FIG. 3, the first slot 53 and the second slot 55 of the first actuator body 13 have an axial length corresponding to the axial length $L_{AB}$ of the first actuator body 13. In this manner, the characteristics of the additional magnetostatic torque $T_{MS,O}$ of the stator body 25 are optimized. Since the axial length $L_{AM}$ of the auxiliary magnets 73, 75 is smaller than the axial length $L_{AB}$ of the first actuator body 13, the end faces 81, 83, 85 and 87 of the auxiliary magnets 73, 75 are bounded by respective empty end portions 89, 91, 93 and 95 of the slots 53 and 55.

In the electrical actuator 11 described above, the first actuator body 13 is provided with the energizing means 33 and the auxiliary magnets 73, 75, while the second actuator body 17 is provided with the permanent main magnet 23. It is noted that the invention also covers electrical actuators in which the first actuator body comprises the permanent main magnet and in which the second actuator body, which is pivotable relative to the first actuator body, comprises the energizing means and the auxiliary magnet.

It is finally noted that the electrical actuator according to the invention may also be applied in other devices in which the angular position of a shaft should be controlled to a constant or variable reference angle. The electrical actuator may, for example, be used in servo-actuated valves in chemical plants and power stations or in devices for deflecting the control surfaces of an aircraft. The actuator may be used as a so-called prime actuator without a transmission, in which case the actuator directly drives a body which is to be displaced, as in the embodiment of the invention described above, or in combination with a transmission for converting a rotational motion into another rotational motion or into a linear motion, in which case the linear position of a body can be accurately controlled by the electrical actuator.

I claim:

1. An electrical actuator for a throttle device, comprising:

a stator portion and a rotor portion having a common longitudinal axis which extends in an axial direction, the rotor portion being pivotable about said axis with respect to the stator portion;

a main permanent magnet comprised in a first of said rotor and stator portions and producing a first magnetic field which is substantially transverse to said axis;

an auxiliary permanent magnet comprised in a second of said rotor and stator portions and providing a second magnetic field which interacts with said first magnetic field to exert a magnetostatic torque ($T_{MS}$) on said rotor portion to pivot it to a preset rest position in relation to the stator portion; and electrical energizing means coupled to said second portion for producing an electromagnetic torque ($T_{EM}$) on said rotor portion in a direction which opposes said magnetostatic torque ($T_{MS}$);

characterized in that the auxiliary permanent magnet has:
    (i) a length in said axial direction which is smaller than a length in said axial direction of the second of said portions; and (ii) a width and a thickness transverse to said longitudinal axis corresponding to a cross-sectional surface area which provides a maximum value of said magnetostatic torque ($T_{MS}$) per unit volume of said auxiliary permanent magnet.

2. An electrical actuator as claimed in claim 1, wherein:

the first of said portions is said rotor portion and the second of said portions is said stator portion;

said rotor portion is a cylindrical permanent magnet body; and said stator portion is a U-shaped body having a length in said axial direction and first and second pole shoes which extend around said rotor portion, a first slot in a surface of the first pole shoe which extends parallel to said longitudinal axis and faces said rotor portion, and a second slot in a surface of the second pole shoe which extends parallel to said longitudinal axis and faces said rotor portion, the first and second auxiliary permanent magnets being respectively included in said first and second slots.

3. An electrical actuator as claimed in claim 2, wherein the first and second slots are of the same length in said axial direction, said length corresponding to the axial length of said stator portion.

4. A throttle device for controlling an air supply inlet of an internal combustion engine, which throttle device comprises an electrical actuator as claimed in claim 1.

* * * * *